(12) United States Patent
Johann et al.

(10) Patent No.: US 9,932,248 B2
(45) Date of Patent: Apr. 3, 2018

(54) DEVICE FOR ENRICHING WATER WITH MAGNESIUM IONS

(71) Applicant: BWT Aktiengesellschaft, Mondsee (AT)

(72) Inventors: Jurgen Johann, Mondsee (AT); Monique Bissen, Mondsee (AT)

(73) Assignee: BWT AKTIENGESELLSCHAFT, Mondsee (AT)

( * ) Notice: Subject to any disclaimer, the term of this patent is extended or adjusted under 35 U.S.C. 154(b) by 55 days.

(21) Appl. No.: 13/952,321

(22) Filed: Jul. 26, 2013

(65) Prior Publication Data
US 2013/0306541 A1   Nov. 21, 2013
US 2018/0002197 A9   Jan. 4, 2018

Related U.S. Application Data

(60) Division of application No. 12/475,936, filed on Jun. 1, 2009, now Pat. No. 8,524,298, which is a (Continued)

(30) Foreign Application Priority Data

Dec. 1, 2006 (DE) .................. 10 2006 058 223

(51) Int. Cl.
*C02F 1/42* (2006.01)
*C02F 1/00* (2006.01)
(Continued)

(52) U.S. Cl.
CPC ............. *C02F 1/42* (2013.01); *C02F 1/003* (2013.01); *C02F 1/68* (2013.01); *B01J 39/07* (2017.01);
(Continued)

(58) Field of Classification Search
CPC ..... C02F 1/42; C02F 1/003; C02F 1/68; C02F 1/685; C02F 2307/04; C02F 2001/425; B01J 39/046; B01J 39/07
See application file for complete search history.

(56) References Cited

U.S. PATENT DOCUMENTS 3,939,071 A   2/1976   Katzakian, Jr. et al.
4,235,715 A   11/1980  Wiegert
(Continued)

FOREIGN PATENT DOCUMENTS

DE   32 43 147 A1   5/1984
DE   38 12 413 A1   10/1989
(Continued)

OTHER PUBLICATIONS

Nelson, Dennis. Natural Variations in the Composition of Groundwater [online], Nov. 2002, [retrieved on Oct. 15, 2015]. Retrieved from the internet <URL: library.state.or.us/repository/2010/201008250826323/index.pdf>.*
(Continued)

*Primary Examiner* — Matthew O Savage
(74) *Attorney, Agent, or Firm* — Bose McKinney & Evans LLP

(57) ABSTRACT

The invention relates to a process and a device for enriching water, in particular drinking water, with magnesium ions. In order to enable enrichment of water with magnesium ions in exchange for calcium ions and/or heavy metal ions during treatment of water, and in particular of drinking water, it is proposed according to the invention to pass the water through an ion exchanger which contains a weakly acidic ion exchange material, wherein at least a part of its ion exchange capacity is loaded with magnesium ions.

6 Claims, 1 Drawing Sheet

Related U.S. Application Data continuation of application No. PCT/EP2007/062854, filed on Nov. 27, 2007.

(51) Int. Cl.
    *B01J 39/07*     (2017.01)
    *C02F 1/68*     (2006.01)

(52) U.S. Cl.
    CPC ........ *C02F 1/685* (2013.01); *C02F 2001/425* (2013.01); *C02F 2307/04* (2013.01)

(56) References Cited

U.S. PATENT DOCUMENTS

| | | | |
|---|---|---|---|
| 4,363,880 A | 12/1982 | Whitney | |
| 4,419,235 A | 12/1983 | Sway | |
| 4,419,246 A | 12/1983 | Jayawant | |
| 4,623,457 A | 11/1986 | Hankammer | |
| 4,642,192 A | 2/1987 | Heskett | |
| 4,664,812 A | 5/1987 | Klein | |
| 4,837,015 A | 6/1989 | Olsen | |
| 5,076,912 A * | 12/1991 | Belz et al. | 210/94 |
| 5,277,823 A | 1/1994 | Hann et al. | |
| 5,814,224 A | 9/1998 | Khamizov et al. | |
| 6,042,725 A * | 3/2000 | Serenko | C02F 1/003 210/266 |
| 6,290,848 B1 * | 9/2001 | Tanner et al. | 210/266 |
| 6,558,547 B1 * | 5/2003 | Solntseva et al. | 210/502.1 |
| 7,273,558 B2 | 9/2007 | Miecznik | |
| 2002/0193453 A1 * | 12/2002 | Bohling et al. | 521/26 |
| 2004/0006223 A1 | 1/2004 | Karki et al. | |
| 2005/0210745 A1 * | 9/2005 | Grott | 47/58.1 SC |

FOREIGN PATENT DOCUMENTS

| | | | | |
|---|---|---|---|---|
| DE | 102006058223 A1 * | 6/2008 | ............. | C02F 1/003 |
| EP | 0 611 595 A1 | 8/1994 | | |
| EP | 1 110 914 A2 | 6/2001 | | |
| GB | 2 013 171 A | 8/1979 | | |
| GB | 2 020 266 A | 11/1979 | | |
| JP | 05-220477 | 8/1993 | | |
| JP | 06-047383 | 2/1994 | | |
| JP | 2004-224980 | 8/2004 | | |
| WO | WO 02/27038 A1 | 4/2002 | | |
| WO | WO 2005/092798 A1 | 10/2005 | | |

OTHER PUBLICATIONS

Bio-Rex Weak Acid Cation Exchange Resin Instruction Manual [online], Jan. 2014, [retrieved on Oct. 15, 2015]. Retrieved from the Internet <URL: www.bio-rad.com/webroot/web/pdf/lsr/literature/LIT206.pdf>.*
Cheremisinoff, "Handbook of Water and Wastewater Treatment Technologies," Butterwork-Heinemann Publications (2002), p. 382.
Dorfner, Konrad, "Ion Exchangers," Walter de Gruyter Berlin—New York 1991, p. 99-108.
Holl, Wolfgang H., Horst, Jurgen, Nagel, Sabine, Shishen, Ma, "Conversion of cation exchange resins to the magnesium form using $Mg(OH)_2$ and $CO_2$," Ion Exchange for Industry, SCI for the application of chemistry and related sciences, 1988, p. 139-147.
Holl, Wolfgang H., Horst, Jurgen, Removal of Heavy Metals from Water Using Weak-Acid Ion Exchange Resins, Vom Wasser, 71, 65-78 (1988).
International Search Report dated Mar. 14, 2008, PCT/EP2007/062854.
International Preliminary Report on Patentability dated Jun. 17, 2009, PCT/EP2007/062854.
"Magnesium Oxide," The Merck—An Encyclopedia of Chemicals, Drugs, and Biologicals (14th Edition) (2010).
Notice of Opposition to a European Patent, EP2094611, Mar. 22, 2011.
Skipton, S.O. et al., "Drinking Water Treatment: Water Softening (Ion Exchange)," NebGuide, Univ. of Nebraska-Lincoln Extension, Institute of Agriculture and Natural Resources, pp. 1-4, Oct. 2008.
Sonawane, "Natural pH Indicators—A Review," Available online at www.phrmainfo.net on May 17, 2007.

* cited by examiner

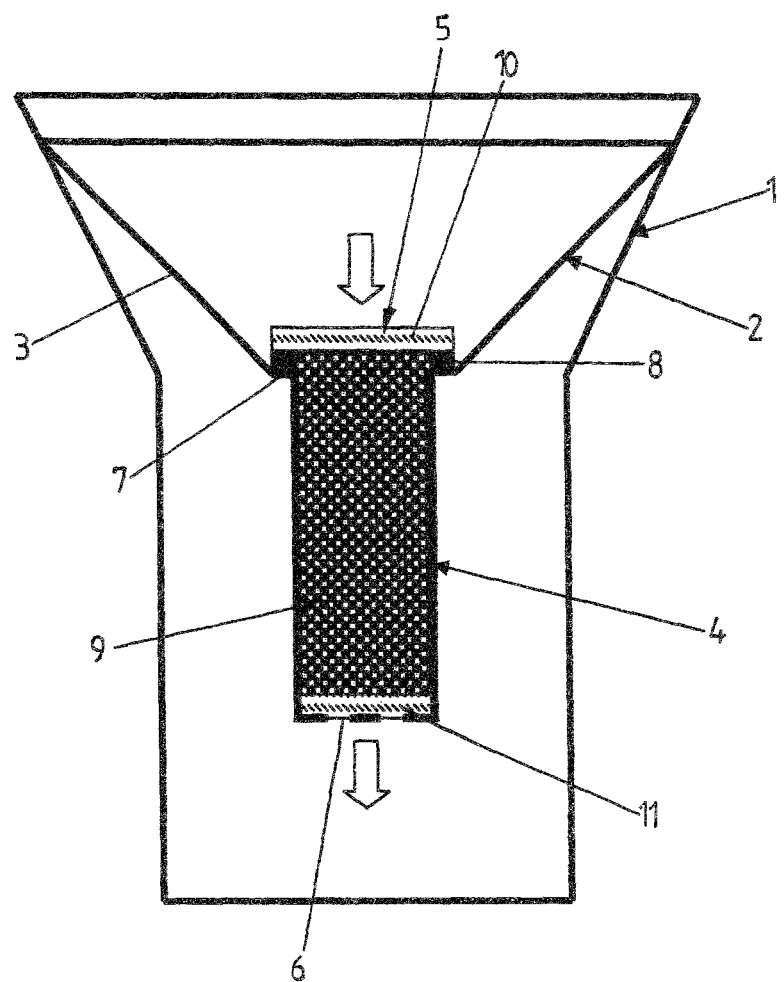

DEVICE FOR ENRICHING WATER WITH MAGNESIUM IONS

RELATED APPLICATIONS

This application is a divisional application of U.S. patent application Ser. No. 12/475,936, filed Jun. 1, 2009, now U.S. Pat. No. 8,524,298, which is a continuation application of International Application PCT/EP2007/062854, filed Nov. 27, 2007, which claims priority to DE 10 2006 058 223.3, filed Dec. 1, 2006, all of which are hereby incorporated by reference in their entirety.

BACKGROUND

The invention relates to a process and a device for enriching water, in particular drinking water, with magnesium ions.

In order to protect installations such as pipelines, hot water generators and fittings from incrustation and corrosion caused by water which flows through them, the water is customarily treated. Since the incrustations are caused mostly by deposits of salts of hardness producing substances such as calcium and magnesium, softening equipment is usually employed to protect such installations. This equipment removes calcium and magnesium ions from the water. The function of the softening equipment is usually based on the ion exchange principle, whereby calcium and magnesium ions are either fully or partially replaced by sodium or potassium ions from an ion exchanger. In order to protect the installations from corrosion, corrosion protection agents can be added to the water in the form of polyphosphates and/or orthophosphates, silicates, carbonates and/or hydroxides, typically using a dosing system.

In addition to treatment of water performed in pipelines or other water supplying installations, other methods are used in which the water is treated directly at the tap location. This type of water processing operation carried out directly at the tap location, and sometimes also in separate containers, is referred to as processing at the point of use ("POU"). The systems used in POU processing are either arranged directly in front of or at the tap. Alternatively, open systems can be employed in which the water is processed in separate containers, typically cans.

Equipment for water processing operations is installed at the tap location directly at the outlet cock or just in front of it. For treatment of water in separate containers, it is known to use systems in which an insert or an attachment for a container is filled from above with the water to be processed, so that the water then flows through a fine filter in order to remove particles, and through activated carbon so as to remove chlorine, flavor imparting substances and odorous substances. The water then flows through an ion exchanger in a lower part of the container to remove hardness producing substances such as calcium and magnesium ions, heavy metals and hydrogen carbonate. These containers are known commercially as so-called "pitchers" or "jugs" and they are offered, for example, by the firms Anna and Brita.

The ion exchangers used in these containers contain mostly weakly acidic cation exchange resins in which the hardness producing substances and heavy metals present in drinking water are for the most part replaced with hydrogen ions from the ion exchanger. A consequence of this replacement is that the processed drinking water has a pH value in the approximate range of 4.5 to 5, while unprocessed drinking water or tap water mostly has a pH value of more than 7.

This lowering of the pH value by these commercial containers has consequences when the water processed in the container is used, as is often the case, not for drinking or cooking, but also for preparation of drinks using hot water, in particular, to make tea. Since only the pH value of the water, and not the ingredients of the tea, is responsible for the color of the tea, such tea becomes brighter and clearer as the pH value of the water is lowered. This is because tea leaves contain catechins, chlorophyll and flavonoids, which are natural pH indicators.

If the pH value is less than 4, the poured tea will be colorless. When the water has a pH of more than 7, the tea is darker, and oxidation of polyphenols which are contained in the tea leaves occurs at the same time. The polyphenols become crosslinked to polymers, which are insoluble in water and which form a thin film on the surface.

For this reason, weakly acidic cation exchange resins are employed in a buffered form in order to prevent lowering the pH value during ion exchange. In this buffered form they are conditioned or loaded to a certain extent with sodium ions or also with potassium ions, while the rest remains in the form of hydrogen ions. However, the total cation load of the raw water is not replaced during the exchange by hydrogen ions, since some of it will be replaced by sodium ions or potassium ions. The pH value of the processed water can be adjusted with this type of buffering to a value of more than 6.

However, it can be generally said that as a result of this treatment of water, physiologically important magnesium ions are removed, to a greater or lesser extent, from drinking water, which causes the quality of the drinking water to deteriorate. Moreover, the increase of the sodium content in drinking water is considered detrimental, in particular when the processed drinking water is used for preparations of meals for infants.

It is known in the art that calcium ions contained in drinking water can be exchanged for magnesium ions by means of ion exchangers with a strongly acidic exchange resin. In this context, a method is described, for example, in DE 100 20 437, wherein an ion exchanger is regenerated with a strongly acidic cation exchange resin, for example, by means of a solution of magnesium chloride. After the regeneration, the strongly acidic exchange resin of the ion exchanger is in the form of magnesium and can then release its magnesium ions in exchange for calcium ions during the preparation of drinking water. After the cationic ion exchange resin has been exhausted, the ion exchanger can again be regenerated with a magnesium chloride solution.

However, in contrast to a strongly acidic cationic ion exchange resin, a weakly acidic cationic exchange resin cannot be regenerated by means of a salt solution, such as, for example, with magnesium chloride. Weakly acidic cationic exchange resins which exist after an application for softening of water in the calcium form, namely, so that they are essentially loaded at 100% of their ion exchange capacity with calcium ions, are exhausted, and they can be regenerated only with acids. This is due mainly to the fact that weakly acidic cationic exchange resins contain as a rule carboxyl groups in the form of strong ions or exchange-active groups, onto which the calcium ions bond in the calcium form. The calcium ions are therefore only slightly dissociated in the ion exchanger and they are exchanged for the hydrogen ion of the acid. After the regeneration with an acid, the exchanger is again in the form of hydrogen ions, i.e., it is essentially loaded up to 100% of its ion exchange capacity with hydrogen ions.

Weakly acidic ion exchange resins can be conditioned after regeneration with an acid in a further preparatory stage, wherein they are converted, for example, with a sodium hydroxide solution or caustic potash solution into the sodium form or the potassium form, in which they are loaded with sodium ions or potassium ions instead of hydrogen ions.

It is also known from prior art that conditioned weakly acidic cationic exchange resins can be used in order to remove other cations, for example, ions of heavy metals or ions of hardness producing substances, from water. In this case, the heavy metal ions or ions of hardness producing substances are exchanged for sodium ions or potassium ions. However, if a weakly acidic cationic exchange resin is in the calcium form, an exchange of cations is no longer possible, with the exception of hydrogen ions.

SUMMARY

The present invention provides a process and device for treatment of water, in particular, for treatment of drinking water, in which the disadvantages described above do not occur and which enriches water with magnesium ions.

This task is achieved by conducting the water through an ion exchanger which contains a weakly acidic ion exchange material, and preferably a weakly acidic cationic exchange resin, which has its ion exchange capacity at least partially loaded or enriched with magnesium ions.

The term a "weakly acidic ion exchanger material" or "cation exchange resin" should be understood within the scope of the present invention material such as the material which is described among others by Hartinger, Ludwig, in "Handbook of Water and Recycling Technology for Metal Processing Industry," Carl Hanser Publishing House, Munich, Vienna 1991. According to Chapter 5.2.3.3 of this handbook, the first distinction to be made with respect to ion exchange resins is whether these ion exchange resins are cation exchangers or anion exchangers, which depends on which exchange-active group is contained in the resin. This group can be then further differentiated depending on whether the cation exchangers are strongly acidic and weakly acidic. Strongly basic and weakly basic exchange resins are differentiated in the case of anion exchangers. The ion exchangers then exhibit the corresponding conduct during the exchange reaction, namely, as strong or weak acids or as strong or weak bases. Accordingly, weakly acidic cation exchangers exhibit the conduct of weak acids, and as such, form a mostly undissociated form, in which they are hardly able to adsorb any other cations.

Surprisingly enough, it has been found that it is possible to quite easily exchange magnesium ions by means of a weakly acidic cation ion exchanger for calcium ions and even for heavy metal ions.

This fact is surprising to the extent that since calcium and magnesium are alkaline earth metals with very similar characteristics, one would expect that magnesium ions would form complexes in the same manner as do calcium ions with the exchange-active carboxyl group of weakly acidic cation exchange resins, which is why dissociation is not present in the matrix of strong ions of the weakly acidic cation exchanger. This conclusion is obvious also to the extent that it is known in the field of detergents that in order to prevent depositing by means of carboxylates, a complexation can be produced which contains both calcium ions and magnesium ions because both types of ions display a similar conduct in the complexation. This would, however, mean that an exchange of magnesium ions of the cation exchanger for other cations would not be possible, with the exception of hydrogen ions.

However, it was possible to prove that a similar exchange is indeed possible with the process and device according to the invention, which can be utilized according to a preferred embodiment of the invention for treatment of drinking water in order to achieve depletion of calcium and/or heavy metal ions present in water with the simultaneous enrichment of water with magnesium ions.

It was determined during tests that magnesium ions are present in a weakly acidic cation exchanger in a much more strongly dissociated form than calcium ions, i.e., they do not enter into a strong bond, in contrast to the calcium ions having carboxyl groups of the weakly acidic cation exchanger. Therefore, since no acid is required for the dissociation of magnesium ions during the exchange reaction or regeneration of the cation exchanger, a weakly acidic cation exchanger which is loaded with magnesium ions is capable of exchanging its magnesium ions for ions that are found in water, such as, for example, calcium, copper or lead ions. When such a weakly acidic cation exchanger is used in the magnesium form for treatment of drinking water, enrichment of the drinking water with magnesium ions will occur, which will replace, either entirely or partially, the other cations that are contained in raw water, such as for example calcium, copper or lead ions.

It is in principle in this case possible to convert weakly acidic cationic exchange material fully into the magnesium form, in which the ion exchanger material is essentially loaded up to 100% of its ion exchanger capacity with magnesium ions. In this case, almost all the cations contained in drinking water will be exchanged during the exchanger reaction for the magnesium ions of the exchanger, whereby a maximum concentration of magnesium ions can be attained in drinking water. During the state when the substance is fully loaded with magnesium, the exchange occurs without an appreciable change of the pH value.

An ion exchanger having a similar material which is loaded with magnesium ions can be advantageously employed for processing of so called gypsum waters, i.e., waters which have a high content of calcium and sulfate. These waters can lead to strong precipitations and sediments of poorly soluble calcium sulfate in pipelines, heat water generators and other water conducting equipment. However, when the calcium ions contained in the water are exchanged in accordance with the process of this invention for magnesium ions, the processed water contains easily soluble magnesium sulfate instead of the poorly soluble calcium sulfate, which clearly reduces the risk of precipitants and sediments.

For the employment of the process in accordance with the invention at the point of use (POU), however, an exemplary embodiment is provided wherein the weakly acidic cation exchanger is only partially loaded with magnesium ions with respect to its ion exchange capacity. This is because a weakly acidic cation exchanger which is only partially loaded with magnesium ions will replace only one part of the calcium ions contained in water by magnesium ions, but it will still remove almost all heavy metals, while at the same time, the pH value of the treated water can be adjusted to a desired value somewhat below 7. In addition, the time required for the loading of the exchanger material can be reduced in this manner.

Since the pH value of the treated water depends on the extent to which the ion exchanger material is loaded with magnesium ions, or on the extent of the loading with the hydrogen ions, one can, for example, advantageously adjust the pH value for preparation of tea to a value of less than 7.0, and preferably to about 6.5, so that the weakly acidic ion exchange material is conveniently loaded with magnesium ions in the range of about 30% to 70%, preferably in the range of about 50% to 60% of its ion exchange capacity, while the rest of the ion exchanger material is in the form of hydrogen ions, so that it is loaded with hydrogen ions in the range of 70% to 30%, and preferably in the range of about 60% to 50% of its ion exchange capacity. In other words, in some embodiments the exchange material is loaded with only magnesium and hydrogen ions. That is, the ion exchange material can be loaded in the range of 70 to 30% of its ion exchange capacity with hydrogen ions and loaded to the remainder of its capacity with magnesium ions. Under these conditions, the drinking water to be processed is enriched with magnesium ions, while the pH value can be at the same time lowered relative to a situation in which the ion exchange material is fully loaded with magnesium ions.

For drinking water it is advantageous when the pH value of the treated water is raised above the value of 6.5 because the concentration of magnesium in the treated water is higher at higher pH values.

The initial loading of the weakly acidic cation exchanger with magnesium or its regeneration preferably occurs by means of a suspension of magnesium oxide to which the cation exchanger is added so that the suspension is stirred for a certain period of time.

BRIEF DESCRIPTION OF DRAWINGS

The FIGURE is a schematic side sectional view of a device for enriching water in accordance with the present invention.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The following is a detailed explanation of an embodiment of the invention indicated in the drawing, wherein the single FIGURE shows a device for enriching water with magnesium ions.

The device or system shown in the drawing includes a container 1 which is open at its upward end, as well as an insert 2 which serves for filtration and treatment of drinking water, and which is suspended in the expanded upper front end of the container 1.

The insert 2 includes an upper part 3 that extends upwards, and an upright, substantially cylindrical lower part having an exchangeable or replaceable cartridge 4 having a cartridge housing which is inserted into the upper part 3 of system or device 1. The cartridge is provided on its upper front end with one inlet opening 5 and on its lower front end with a plurality of outlet openings 6. The cartridge 4 is penetrated in the upper part with a round receiving opening created in the bottom 7 of the upper part 3, and it is sealed by means of an annular seal 8 in relation to the upper part 3, so that no water can be introduced from the upper part 3 onto the cartridge 4 in the inner part of the container 1. The upper part 3 forms a reservoir for the water to be treated, which flows after the upper part 3 has been filled due to gravity through the cartridge 4 into the container 1. The cartridge 4 contains an ion exchanger 9, which has the form of a packing made of a weakly acidic cationic exchange resin loaded with magnesium ions, so that when the water flows through the cartridge 4, calcium ions and heavy metal ions obtained from the water are exchanged for magnesium ions from the cationic exchange resin and the treated water is thus enriched in this manner with magnesium ions. At the upper end and at the lower end of the cartridge 4, respectively, is deployed a fine filter 10 or 11, which prevents entry of contaminants such as particles contained in raw water into the ion exchanger 9, or the discharge of solid substances from the cartridge 4 through the outlet openings 6 provided in the container 1.

A cation exchanger of the Lanxess Company, type S 8227, was employed in the lower part 3 of the insert 2 as the ion exchanger 9 during water treatment tests performed with a similar container, which was loaded ahead of time with magnesium ions so that it was loaded to about 60% of its ion exchanger capacity with ions in the form of magnesium ions, while hydrogen ions were used for the remaining capacity.

In order to load the weakly acidic cation exchange resin of the cation exchanger with magnesium ions, the exchanger resin of the ion exchanger, which was first in the form of hydrogen ions, was processed in batch in an aqueous suspension of magnesium oxide (MgO) so that the suspension was stirred during a period of several hours.

During the subsequent tests, the cation exchanger was impacted by tap water which contained calcium and magnesium ions, as well as copper ions in different concentrations. The content of calcium ions and magnesium ions, or copper ions, was measured before and after the tap water passed through the cation exchanger in order to determine the success of the enriching of drinking water with magnesium ions, or the success of the removal of heavy metal ions.

Tables 1 and 2 show the results of the tests with respect to the enriching of the water with magnesium ions, and the changes of the pH value and of the content of calcium ions for two different tap water types, wherein the pH value and the concentration of $Ca^{++}$ ions and $Mg^{++}$ ions are indicated both for the inflow to and outflow from the ion exchanger depending on the volume of the processed water.

TABLE 1

| Water Volume in Liters | Inflow to the Ion Exchanger | | | Outflow from the Ion Exchanger | | |
| --- | --- | --- | --- | --- | --- | --- |
| | pH | $Ca^{++}$ in ppm | $Mg^{++}$ in ppm | pH | $Ca^{++}$ in ppm | $Mg^{++}$ in ppm |
| 2 | 7.6 | 115 | 16.0 | 6.7 | 14.1 | 13.8 |
| 8 | 7.6 | 113 | 17.4 | 6.3 | 15.7 | 24.2 |
| 14 | 7.6 | 112 | 15.6 | 6.3 | 18.0 | 25.6 |
| 26 | 7.6 | 111 | 15.1 | 6.5 | 29.1 | 29.8 |
| 38 | 7.6 | 112 | 14.7 | 6.6 | 40.2 | 29.3 |
| 71 | 7.6 | 114 | 14.9 | 7.0 | 84.1 | 20.9 |
| 106 | 7.6 | 114 | 14.2 | 7.1 | 91.3 | 18.0 |
| 126 | 7.6 | 114 | 14.2 | 7.2 | 97.8 | 16.1 |

TABLE 2

| Water Volume in Liters | Inflow to the Ion Exchanger | | | Outflow from the Ion Exchanger | | |
| --- | --- | --- | --- | --- | --- | --- |
| | pH | $Ca^{++}$ in ppm | $Mg^{++}$ in ppm | pH | $Ca^{++}$ in ppm | $Mg^{++}$ in ppm |
| 2 | 7.4 | 80.4 | 8.78 | 6.7 | 7.8 | 0.3 |
| 5 | 7.4 | 68.2 | 5.20 | 6.4 | 9.2 | 10.5 |

TABLE 2-continued

| Water Volume in Liters | Inflow to the Ion Exchanger | | | Outflow from the Ion Exchanger | | |
|---|---|---|---|---|---|---|
| | pH | $Ca^{++}$ in ppm | $Mg^{++}$ in ppm | pH | $Ca^{++}$ in ppm | $Mg^{++}$ in ppm |
| 10 | 7.4 | 63.7 | 3.77 | 6.4 | 11.8 | 14.0 |
| 21 | 7.4 | 63.5 | 3.83 | 6.5 | 15.5 | 15.7 |
| 61 | 7.5 | 62.9 | 3.92 | 6.8 | 32.6 | 12.8 |
| 106 | 7.5 | 69.4 | 5.31 | 6.9 | 39.6 | 14.8 |
| 123 | 7.4 | 69.6 | 5.94 | 6.9 | 50.3 | 9.9 |

As one can see from Table 1 and 2, one part of the calcium ions contained in the water is exchanged during the passage of the water through the ion exchanger for magnesium ions from the weakly acidic cation exchanger resin. Therefore, the concentration of the magnesium ions in the treated water is clearly above the concentration of the magnesium ions in the raw water. Further, it is also evident that the pH value of the water after the water has passed through the ion exchanger is at least 6.3, which means that the water flowing out of the ion exchanger is particularly suitable for preparation of tea.

Table 3 shows the results of tests carried out with different tap water with respect to enriching with copper ions in water, enriching with magnesium ions in water, and changes in the content of calcium ions, wherein depending on the volume of the treated water, the concentration of the $Ca^{++}$, $Mg^{++}$ and Cu ions are indicated during the inflow to and outflow from the ion exchanger.

TABLE 3

| Water Volume in Liters | Inflow to Ion Exchange | | | Outflow from Ion Exchanger | | |
|---|---|---|---|---|---|---|
| | $Ca^{++}$ in ppm | $Mg^{++}$ in ppm | $Cu^{++}$ in ppm | $Ca^{++}$ in ppm | $Mg^{++}$ in ppm | $Cu^{++}$ in ppm |
| 3 | 116 | 23.4 | 2.09 | 22.9 | 26.0 | 0.11 |
| 16 | 118 | 24.8 | 2.19 | 59.0 | 35.0 | 0.13 |
| 40 | 119 | 24.7 | 2.13 | 83.2 | 27.9 | 0.24 |

As one can see from Table 3, the weakly acidic cation exchanger of the exchange resin was capable of exchanging more than 90% of the copper ions contained in water for hydrogen or magnesium ions.

It was then determined during further tests that the same was true also about other heavy metal ions, such as for example lead ions, which were also exchanged for magnesium ions.

In summary, one can say that an ion exchanger having a weakly acidic cation exchange resin makes it possible to remove both calcium and heavy metal ions from raw water and replace them with magnesium ions.

Unlike with an ion exchanger which has a weakly acidic cationic exchange resin in the form of hydrogen ions and which exchanges only cations that stoichiometrically correspond to the hydrogen carbon ions, cations of corresponding sulfates, nitrates and chlorides are additionally also exchanged.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for enriching drinking water with magnesium ions, comprising:
 a cartridge which contains a weakly acidic ion exchange material loaded in the range of 70 to 30% of its ion exchange capacity with hydrogen ions and loaded to the remainder of its capacity with magnesium ions;
 wherein, when water flows through the cartridge, calcium ions and heavy metal ions obtained from the water are exchanged for magnesium ions and the treated water is enriched with magnesium ions.

2. The device of claim 1, wherein the ion exchange material comprises a packing made of resin.

3. The device of claim 1, further comprising a filter arranged before or after the ion exchange material in the direction of the flow of water through the cartridge.

4. The device of claim 1, wherein the ion exchange material comprises a weakly acidic cationic exchange resin.

5. A device for enriching drinking water with magnesium ions, comprising:
 a cartridge which contains a bed made of a weakly acidic cation exchange material loaded with only magnesium and hydrogen ions and loaded in the range of 70 to 30% of its ion exchange capacity with hydrogen ions;
 wherein, when water flows through the cartridge, calcium ions and heavy metal ions obtained from the water are exchanged for magnesium ions and the treated water is enriched with magnesium ions.

6. The device of claim 5, further comprising a filter arranged before or after the ion exchange material in the direction of flow of water through the cartridge.

* * * * *